(12) United States Patent
Feng et al.

(10) Patent No.: US 12,430,582 B2
(45) Date of Patent: Sep. 30, 2025

(54) METHOD AND SYSTEM FOR DISTRIBUTED DEEP MACHINE LEARNING

(71) Applicant: VERIZON PATENT AND LICENSING INC., Basking Ridge, NJ (US)

(72) Inventors: Andrew Feng, Cupertino, CA (US); Jun Shi, Sunnyvale, CA (US); Mridul Jain, Cupertino, CA (US); Peter Cnudde, Los Altos, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1042 days.

(21) Appl. No.: 17/376,962

(22) Filed: Jul. 15, 2021

(65) Prior Publication Data

US 2021/0342747 A1 Nov. 4, 2021

Related U.S. Application Data

(63) Continuation of application No. 15/009,968, filed on Jan. 29, 2016, now Pat. No. 11,087,234.

(51) Int. Cl.
*G06N 20/00* (2019.01)

(52) U.S. Cl.
CPC .................................... *G06N 20/00* (2019.01)

(58) Field of Classification Search
CPC ..................................................... G06N 20/00
See application file for complete search history.

(56) References Cited

U.S. PATENT DOCUMENTS

| | | |
|---|---|---|
| 8,027,938 B1 | 9/2011 | Xu et al. |
| 2013/0254196 A1 | 9/2013 | Babu et al. |
| 2013/0290223 A1 | 10/2013 | Chapelle et al. |
| 2015/0193695 A1 | 7/2015 | Cruz Mota et al. |
| 2015/0254330 A1 | 9/2015 | Chan et al. |
| 2015/0254555 A1 | 9/2015 | Williams, Jr. et al. |
| 2015/0324690 A1 | 11/2015 | Chilimbi et al. |
| 2016/0004609 A1 | 1/2016 | Knight |

(Continued)

OTHER PUBLICATIONS

Crotty, A., Galakatos, A., & Kraska, T. (2014). Tupleware: Distributed Machine Learning on Small Clusters. IEEE Data Eng. Bull., 37(3), 63-76. (Year: 2014).*

(Continued)

*Primary Examiner* — Kamran Afshar
*Assistant Examiner* — Lokesha Patel

(57) ABSTRACT

The present teaching relates to distributed deep machine learning on a cluster. In one example, a request is received for estimating one or more parameters associated with a machine learning model on a cluster including a plurality of nodes. A set of data is obtained to be used for estimating the one or more parameters. The set of data is divided into a plurality of sub-sets of data, each of which corresponds to one of the plurality of nodes. Each sub-set of data is allocated to a corresponding node for estimating values of the one or more parameters based on the sub-set of data. Estimated values of the one or more parameters obtained based on a corresponding sub-set of data allocated to the node, are received from each of the plurality of nodes. The one or more parameters of the machine learning model are estimated based on the estimated values of the one or more parameters generated by at least some of the plurality of nodes.

14 Claims, 17 Drawing Sheets

(56) References Cited

U.S. PATENT DOCUMENTS

2016/0004610 A1 1/2016 Knight
2016/0103901 A1 4/2016 Kadav et al.

OTHER PUBLICATIONS

Jacobsen, Dana A et al "An MPI-CUDA Implementation for Massively Parallel Incompressible Flow Computations on Multi-GPU Clusters" Boise State University [Publish 2010] [Retrieved Mar. 2021] <URL: https://scholarworks.boisestate.edu/cgi/viewcontent.cgi?article=1004&context=mecheng_facpubs> (Year: 2010).
Marsic, Ivan "Ctgars omputer Networks: Performance and Quality of Service" Rutgars University [Published 2013] [Retrieved Oct. 2020] <URL: https ://www .ece. rutgers .edu/-marsic/books/CN/book-CN_marsic. pdf> (Year: 2013).
Skoda, Petr "Scheduler for the Stream Processing Frameworks on Hadoop Clusters" Brno UT [Published Nov. 2014] [Retrieved Apr. 2020] <URL: https://is.muni.cz/th/azdby/rigo_skoda_with_papers.pdf> (Year: 2014).
Chen, Linchuan et al. "Accelerating MapReduce on a coupled CPU-GPU architecture" SC'12 [Published 2012] [Retrieved Apr. 2020] <URL: https://ieeexplore.ieee.org/abstract/document/6468489> (Year: 2012).
Dean et al. "Large Scale Distributed Deep Networks" NIPS 2012 [Published Online 2012] [Retrieved Online Dec. 2018] <URL: https://www.cs.toronto.edu/-ranzato/publications/DistBeliefN IPS2012_withAppendix.pdf> (Year: 2012).
Zhang et al. "Poseidon: A System Architecture for Efficient GPU-based Deep Learning on Multiple Machines" arxiv.og [Published Online Dec. 19, 2015] [Retrieved online Dec. 18] <URL: https:/arxiv.org/pdf/1512.06216.pdf> (Year: 2015).
Agarwal "A reliable effective terascale linear Learning System" Journal of Machine Learning Research vol. 15 pp. 1111-1133 [Published Online 2014] [Retrieved on line Dec. 18] <URL: http://www.jmlr.org/papers/volume15/agarwal14a/agarwal14a.pdf> (Year: 2014).
Moritz et al. "SparkNet: Training Deep Networks in Spark" arXiv.org [V2 Published Nov. 26, 2015] [Retrieved Online Dec. 18] <URL: https://arxiv.org/pdf/1511.06051v2.pdf> (Year: 2015).
Reyes-Ortiz et al. "Big Data Analytics in the Cloud . . . " Procedia Computer Science vol. 53 pp. 121-130 [Publsihed Online 2015] [Retrieved Online Dec. 18] <URL: https://www.sciencedirect.com/science/article/pii/S1877050915017895> (Year: 2015).
Li et al. "Parameter Server for Distributed Machine Learning" Big Learning NIPS 2013 [Published Online 2013] [Retrieved Online Dec. 18] <U RL:http://www.cs.cmu.edu/-feixia/files/ps.pdf> (Year: 2013).
Notice of Allowance issued Jun. 27, 2019 in Taiwanese Application No. 106102598.
Office Action issued Dec. 21, 2018 in Taiwanese Patent Application 106102598.
International Preliminary Report on Patentability mailed Aug. 9, 2018 in International Application PCT/US2017/015208.
International Search Report and Written Opinion mailed Apr. 14, 2017 in International Application PCT/US2017/015208.
Wei et al., "Managed communication and consistency for fast data-parallel iterative analytics." In: Proceedings of the Sixth ACM Symposium on Cloud Computing, Aug. 29, 2015.

\* cited by examiner

```
spark-submit –master yarn –deploy-mode cluster
    –files solver.prototxt, net.prototxt
    –num-executors <# of EXECUTORS>
    –archives caffe_on_grid.tgz
    –conf spark.executorEnv.LD_LIBRARY_PATH="./caffe_on_grid.tgz/lib64"
    –class com.yahoo.ml.CaffeOnSpark caffe-on-spark-1.0-jar-with-dependencies.jar
    -devices <# of GPUs PER EXECUTOR>
    -conf solver.prototxt
    -model hdfs://<MODEL FILE>
```

1110 — spark-submit line
1102 — files/num-executors/archives block
1104 — class line
1108 — conf solver / model block

```
class CaffeOnSpark(val sc: SparkContext) {
  def train[T1,T2](source:DataSource[T1,T2]) : Unit
  def test[T1,T2](source:DataSource[T1,T2]) : : Map[String, Seq[Double]]
  def features[T1,T2](source:DataSource[T1,T2]) : DataFrame
}
object CaffeOnSpark {
  def getSource(conf:Config, layerId:Int, isTraining:Boolean): DataSource[_,_]
}
class DataSource[T1, T2] {
  def makeRDD(sc: SparkContext) : RDD[T1]
  def nextBatch(sampleIds: Array[String], data: T2, labels: FloatBlob) : Boolean
}
```

```
object sampleUseCase {
  val sc: SparkContext = new SparkContext(new SparkConf())
  val caffe_on_spark = new CaffeOnSpark(sc)
  val training_source = DataSource.getSource(new Config(), true)
  caffe_on_spark.train(training_source)
  val feature_source = DataSource.getSource(new Config(), false)
  val data_frame = caffe_on_spark.features(feature_source)
  val LR_model =
    LogisticRegression_Pipeline.fit(data_frame.data_frame.select("..."))
  //...
}
```

FIG. 13

METHOD AND SYSTEM FOR DISTRIBUTED DEEP MACHINE LEARNING

CROSS REFERENCE TO RELATED APPLICATION

The present application is a continuation of U.S. patent application Ser. No. 15/009,968 filed Jan. 29, 2016, entitled "METHOD AND SYSTEM FOR DISTRIBUTED DEEP MACHINE LEARNING", which is hereby incorporated by reference in its entirety.

BACKGROUND

1. Technical Field

The present teaching relates to methods, systems, and programming for distributed computing. Particularly, the present teaching is directed to methods, systems, and programming for distributed deep machine learning on a cluster.

2. Discussion of Technical Background

Distributed computing is a field of computer science that studies distributed systems, which include multiple autonomous computers or parallel virtual machines that communicate through a computer network, such as a computer cluster having multiple nodes. Deep learning or deep machine learning is a branch of machine learning based on a set of algorithms that attempt to model high-level abstractions in data by using multiple processing layers with complex structures. Deep learning has traditionally been conducted on an individual server. To learn from large datasets, it is desirable to conduct deep learning using many servers in a distributed system.

Current techniques for distributed machine learning are based on dedicated clusters that are built from scratch and cannot be integrated with existing data processing pipelines. Existing works on distributed machine learning lack direct communications among operation nodes in the cluster, which increases end-to-end learning latency and does not support asynchronous distributed learning. When the system fails, an existing method requires a re-learning from scratch.

Therefore, there is a need to develop techniques for distributed deep machine learning to overcome the above drawbacks.

SUMMARY

The present teaching relates to methods, systems, and programming for distributed computing. Particularly, the present teaching is directed to methods, systems, and programming for distributed deep machine learning on a cluster.

In one example, a method, implemented on a machine having at least one processor, storage, and a communication platform capable of connecting to a network for estimating one or more parameters on a cluster including a plurality of nodes, is disclosed. A request is received for estimating one or more parameters associated with a machine learning model. A set of data is obtained to be used for estimating the one or more parameters. The set of data is divided into a plurality of sub-sets of data, each of which corresponds to one of the plurality of nodes. Each sub-set of data is allocated to a corresponding node for estimating values of the one or more parameters based on the sub-set of data. Estimated values of the one or more parameters obtained based on a corresponding sub-set of data allocated to the node, are received from each of the plurality of nodes. The one or more parameters of the machine learning model are estimated based on the estimated values of the one or more parameters generated by at least some of the plurality of nodes.

In another example, a system having at least one processor, storage, and a communication platform connected to a network for estimating one or more parameters on a cluster including a plurality of nodes is disclosed. The system comprises: a configuration information identifier configured for receiving a request for estimating one or more parameters associated with a machine learning model; a training data locator configured for obtaining a set of data to be used for estimating the one or more parameters; a training data distributor configured for dividing the set of data into a plurality of sub-sets of data, each of which corresponds to one of the plurality of nodes and allocating each sub-set of data to a corresponding node for estimating values of the one or more parameters based on the sub-set of data; and a training model determiner configured for receiving, from each of the plurality of nodes, estimated values of the one or more parameters obtained based on a corresponding sub-set of data allocated to the node and estimating the one or more parameters of the machine learning model based on the estimated values of the one or more parameters generated by at least some of the plurality of nodes.

Other concepts relate to software for implementing the present teaching on distributed deep machine learning. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon for estimating one or more parameters on a cluster including a plurality of nodes is disclosed. The medium, when read by the machine, causes the machine to perform the following: receiving a request for estimating one or more parameters associated with a machine learning model; obtaining a set of data to be used for estimating the one or more parameters; dividing the set of data into a plurality of sub-sets of data, each of which corresponds to one of the plurality of nodes; allocating each sub-set of data to a corresponding node for estimating values of the one or more parameters based on the sub-set of data; receiving, from each of the plurality of nodes, estimated values of the one or more parameters obtained based on a corresponding sub-set of data allocated to the node; and estimating the one or more parameters of the machine learning model based on the estimated values of the one or more parameters generated by at least some of the plurality of nodes.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 illustrates an exemplary user command for distributed machine learning, according to an embodiment of the present teaching;

FIG. 12 illustrates an exemplary application program interface (API) for distributed machine learning, according to an embodiment of the present teaching;

FIG. 13 illustrates an exemplary program for distributed machine learning, according to an embodiment of the present teaching;

DETAILED DESCRIPTION

Figure 1:
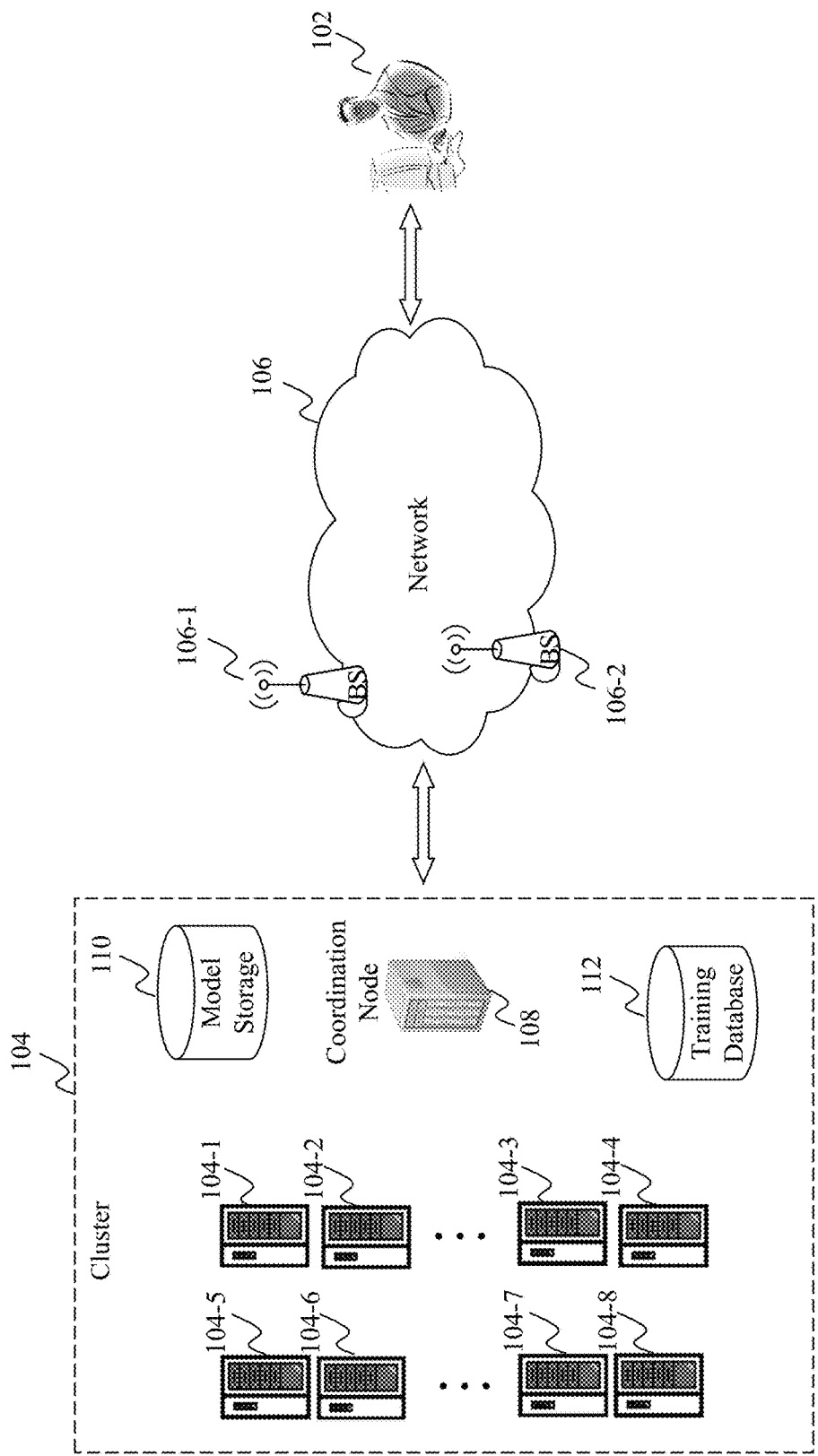
FIG. 1 is a high level depiction of an exemplary networked environment for distributed deep machine learning on a cluster, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of distributed deep machine learning on a cluster. The method and system as disclosed herein aim at performing distributed deep learning in an efficient manner.

A computer program that runs in the distributed system is called a distributed application. For instance, APACHE HADOOP is a software framework that supports data-intensive distributed applications under a free license. It enables applications to work with thousands of nodes and petabytes of data. Deep learning can be directly conducted on Hadoop clusters, e.g. to empower online photo services (such as Flickr) to automatically tag all user photos, and to enable Flickr end users to organize and find photos easily. This avoids unnecessary data movement between Hadoop clusters and separate deep learning clusters.

Instead of building new deep learning clusters, the present teaching introduces a solution for leveraging existing computing clusters, e.g. clusters powered by Apache Hadoop or Apache Spark. According to one embodiment of the present teaching, deep learning may be defined as first-class steps in Apache Oozie workflows with Hadoop for data processing and Spark for deep machine learning and non-deep machine learning. Multiple experiments of deep learning can be conducted concurrently on a single cluster, which makes deep learning extremely cost effective as opposed to conventional methods.

Deep learning on Hadoop is a novel approach for deep learning. Existing approaches in the industry require dedicated clusters. Deep learning on Hadoop enables the same level of performance as with dedicated clusters while simultaneously providing more benefits. In one embodiment, because deep learning is performed directly upon the datasets in existing clusters, there is no need to move data or to set up new clusters, which reduces end-to-end learning time and enable faster iteration during deep learning. A simple API can be implemented for distributed training, test and feature extraction, which allows easy integration with existing data processing pipelines.

In one embodiment, system architecture allows deep learning libraries (e.g. Caffe) to be deployed into many Spark executor processes, each with multiple graphics processing unit (GPU) or central processing unit (CPU) devices, and then perform distributed learning by these executors from resilient distributed datasets (RDD). In addition, the system supports message passing interface (MPI) style communication efficiently to share model updates among multiple Spark executor processes, some of which may share host machines. The communication may support Infiniband and Ethernet networks.

In accordance with one embodiment, the system can snapshot learning states during the deep learning tolerate system failures. For example, a snapshot of a learning state is taken and stored in a database outside the cluster. Then, if the whole cluster fails afterwards, the system can retrieve the snapshot and resume the deep learning from there on. If some nodes in the cluster become unavailable during the deep learning, the learning can also continue with the rest nodes, based on communications among the nodes regarding the states of the learning before the failures.

The system can support both synchronous and asynchronous distributed learnings, and can also support multiple input formats by modular source layers.

The terms "deep learning" and "deep machine learning" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for distributed deep machine learning on a cluster, according to an embodiment of the present teaching. In FIG. 1, the exemplary networked environment 100 includes one or more users 102, a cluster 104, and a network 106. In this exemplary networked environment 100, a user 102, who may be a network administrator, operator, developer, or customer of the cluster 104, may send a request to the cluster 104 via the network 106 or via an internal or proprietary network connection (not shown) to start a distributed machine learning process and retrieve a result from the cluster 104. The term "machine learning process" referred herein may include any process that tunes a number of parameters to be simultaneously optimal on training dataset using one or more machines.

The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof. The network 106 may also include various network access points, e.g., wired or wireless access points such as base stations or Internet exchange points 106-1, . . . , 106-2, through which a data source may connect to the network in order to transmit information via the network.

The cluster 104 in which the distributed machine learning is performed includes a plurality of operation nodes 104-1, 104-2, . . . 104-7, 104-8, and at least one coordination node 108 (e.g., a gateway node in a HADOOP cluster), which communicate through the network 106 or through an internal network (not shown). In this example, each node of the cluster 104 may be an autonomous physical machine, such as a server, a workstation, a desktop or laptop computer, a netbook, a tablet, a smart phone, a game console, a set-top box, or any other suitable machine. In another example, some or all of the nodes may be parallel virtual machines implemented by either software emulation or hardware virtualization. The cluster 104 may be a set of machines owned by one entity, e.g., an enterprise, and maintained as a server farm or server cluster where the servers are mounted on racks in a server room or data center. The cluster 104 may also be a collection of machines owned by different entities and that are physically separate from each other at a distance.

In this example, the cluster 104 may also include a training database 112 that stores one or more very large training datasets, for example, each including trillions of features, billions of training samples, and millions of parameters, for distributed machine learning performed on the cluster 104. For example, training datasets may be recorded on a remote server (not shown) outside the cluster 104 and transmitted (e.g., copied) to the training database 112 through the coordination node 108 prior to the learning process starts. By the time of running the distributed machine learning process, the training datasets have already resided on the cluster 104, for example, in the central training database 112 of the cluster 104, as shown in FIG. 1, or have been partitioned across the regular nodes 104-1, 104-2, . . . 104-7, 104-8 of the cluster 104. In one example, a preprocessing step may have been performed in a HADOOP cluster as a HADOOP job to split training data randomly across the operation nodes 104-1, 104-2, . . . 104-7, 104-8. The cluster 104 in this example acts as both the data storage and the computational resource for achieving high data locality which in turn results in high performance.

In this example, the cluster 104 may also include a model storage 110 that stores trained models or state snapshots of a model during a distributed training. In one embodiment, because the operation nodes can exchange state information of a model during the distributed training, each of the operation nodes has the same state information after the exchanging, e.g. after each iteration during the training. Then, one of the operation nodes can store the state information directly into the model storage 110.

Figure 2:
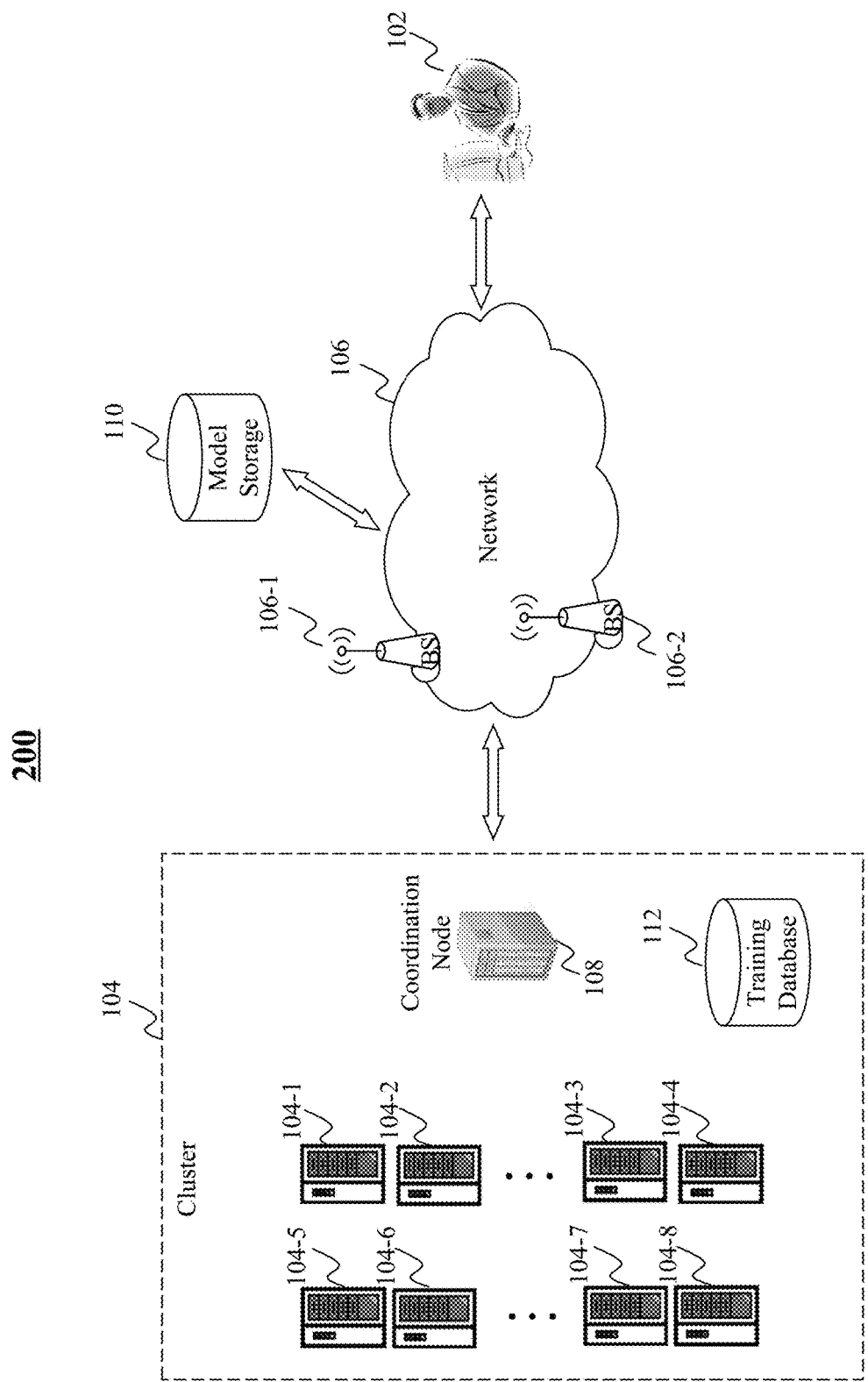
FIG. 2 is a high level depiction of another exemplary networked environment for distributed deep machine learning on a cluster, according to an embodiment of the present teaching.

FIG. 2 is a high level depiction of another exemplary networked environment 200 for distributed deep machine learning on a cluster, according to an embodiment of the present teaching. The exemplary networked environment 200 in this embodiment is similar to the exemplary networked environment 100 in FIG. 1, except that the model storage 110 is outside the cluster 104 and connected to the network 106.

Figure 3:
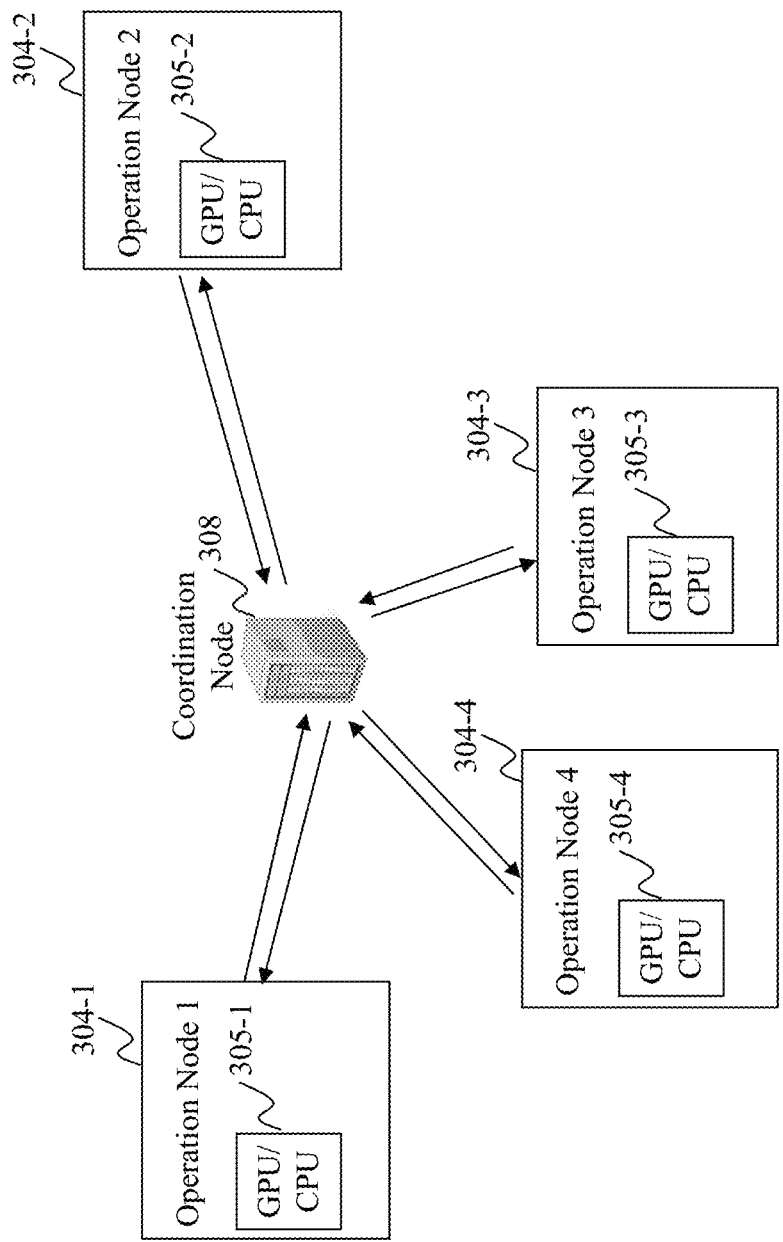
FIG. 3 illustrates an example of distributed machine learning on a cluster, according to prior art.

FIG. 3 illustrates an example of distributed machine learning on a cluster, according to prior art. As shown in FIG. 3, the cluster includes a coordination node 308 and multiple operation nodes 304-1, . . . 304-4. Each operation node includes a single GPU or CPU for executing the task of machine learning. After each iteration during a distributed training of a model, each operation node sends the calculated state of the model to the coordination node 308 to integrate the states calculated by different nodes based on different training data subsets. Then, the coordination node 308 has to send the integrated state back to each operation node for next iteration of distributed training. This takes a long time for the distributed machine learning.

Figure 4:
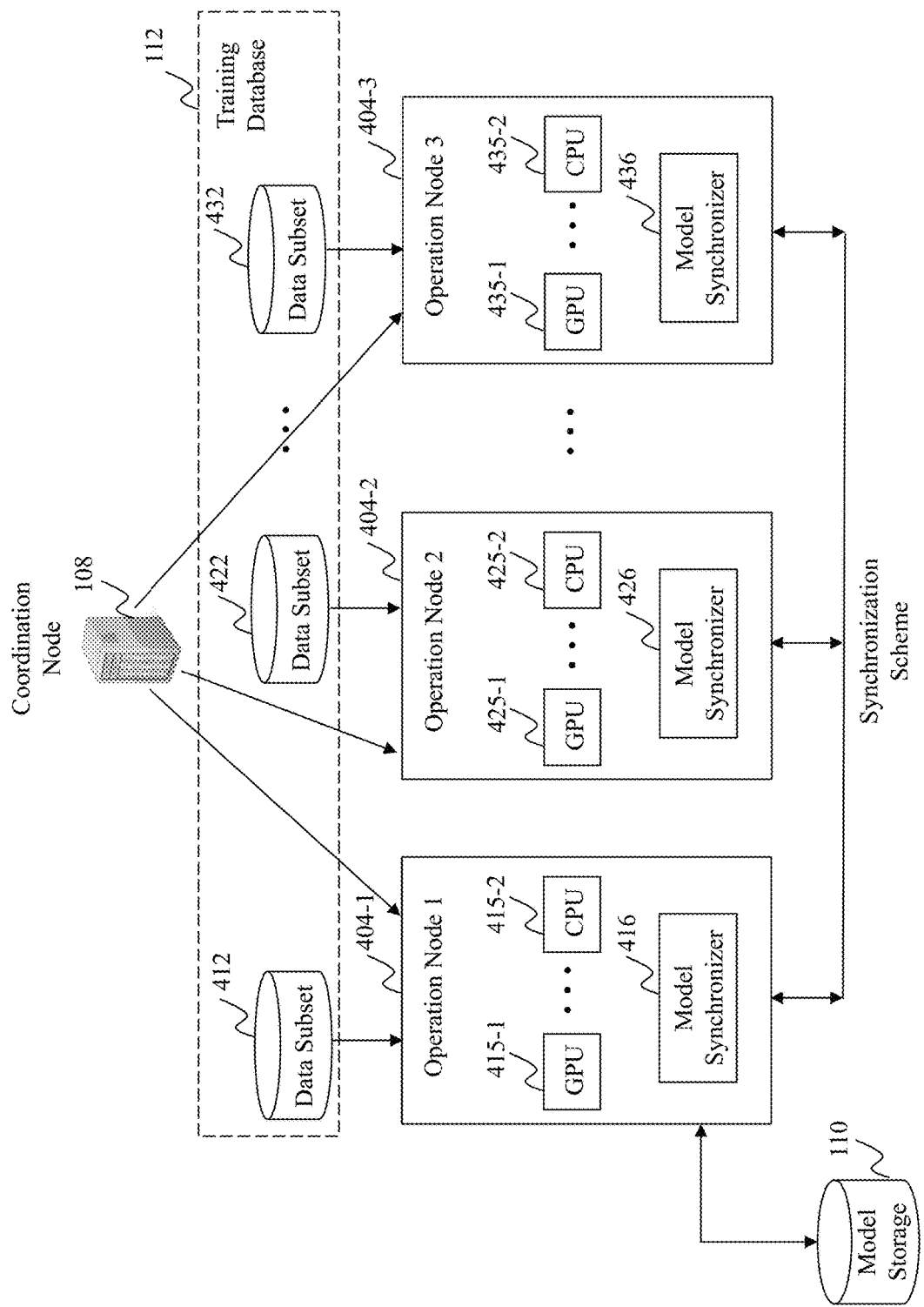
FIG. 4 illustrates an exemplary scheme of distributed machine learning on a cluster, according to an embodiment of the present teaching.

FIG. 4 illustrates an exemplary scheme of distributed machine learning on a cluster, according to an embodiment of the present teaching. As shown in FIG. 4, the coordination node 108 in this cluster can instruct the operation nodes 404-1, . . . 404-3 to perform a machine learning, e.g. to estimate a model parameter in a distributed deep learning, upon a request from a user. The coordination node 108 may divide the data in the training database 112 into multiple data subsets 412, 422, 432 and allocate each of the data subsets to one of the operation nodes for estimating the parameter. In this example, each operation node may include multiple GPUs and/or CPUs that can execute the training or estimating in parallel. Each operation node can enable the GPUs/CPUs within the operation node to exchange calculation results after each training round. For example, each GPU/CPU node can have two separate network interfaces, Ethernet and Infiniband. While Ethernet can act as the primary interface for external communication, Infiniband can provide 10 times faster connectivity among the GPU/CPU nodes in the cluster. It can be understood that in other embodiments, Ethernet (instead of Ininiband) can provide connectivity among the GPU/CPU nodes in the cluster. It can also be understood that other network interfaces can also be utilized for connections between operation nodes or among GPUs/CPUs in each operation node.

The operation nodes can communicate with each other directly, e.g. via a synchronization scheme, without the help from the coordination node 108. For example, each operation node includes a model synchronizer 416, 426, 436 for "synchronize" with other operation nodes, e.g. by directly accessing GPU/CPU memories of other operation node via remote direct memory access (RDMA). As such, after each training round, the operation nodes can be synchronized to share a same state of the training model. In addition, each GPU or CPU in each operation node can have the shared state. In one embodiment, one GPU or CPU in one operation node can take a snapshot of the state and store it into the model storage 110. Because the model storage 110 is outside the operation nodes, if one or more operation nodes fail during a deep learning, the rest nodes can resume based on last stored state of the model in the model storage 110.

Figure 5:
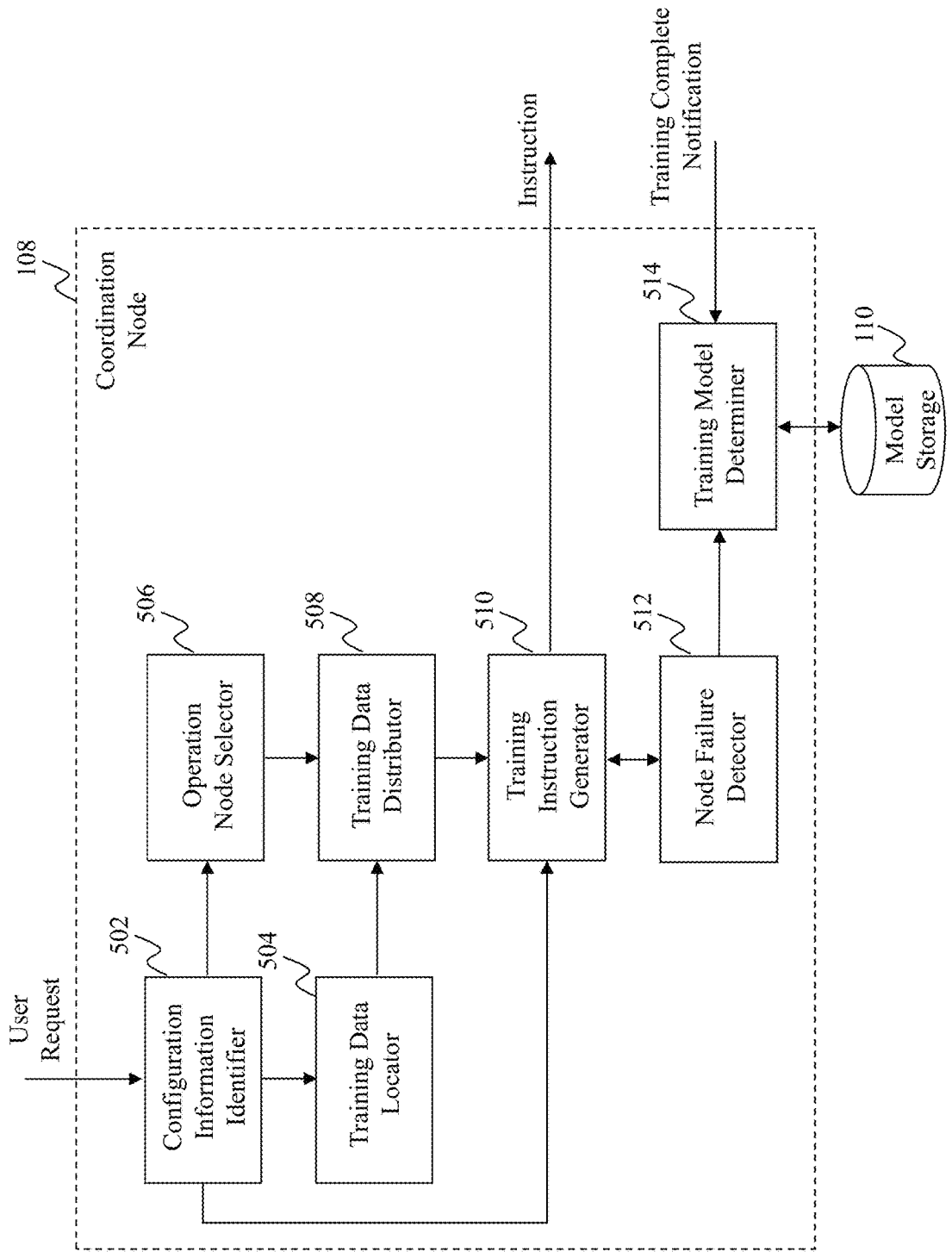
FIG. 5 illustrates an exemplary diagram of a coordination node, according to an embodiment of the present teaching.

FIG. 5 illustrates an exemplary diagram of a coordination node 108, according to an embodiment of the present teaching. The coordination node 108 in this example includes a configuration information identifier 502, a training data locator 504, an operation node selector 506, a training data distributor 508, a training instruction generator 510, a node failure detector 512, and a training model determiner 514.

The configuration information identifier 502 in this example may receive a user request, either via a network or directly from a user, for feature extraction, training a machine learning model, or validating a model of a deep learning, etc. A user request may be in form of a user command that includes configuration information related to the model. For example, configuration information may include information about number of operation nodes, number of GPUs per operation node, location of a deep learning library, etc. The configuration information identifier 502 may extract and determine the configuration information from the request.

FIG. 11 illustrates an exemplary user command for distributed machine learning, according to an embodiment of the present teaching. The present teaching enables deep learning on enhanced Hadoop clusters, based upon open source software libraries, e.g. Apache Spark and Caffe. Accordingly, a user can submit deep learning jobs onto a Hadoop cluster (-master yarn) via a command as illustrated in FIG. 11. As shown in FIG. 11, a user may use the command to specify the number of Spark executor processes to be launched (-num-executors 1102), the number of CPU/GPU devices to be allocated for each executor (-devices 1104), and the HDFS path where the model should be saved 1108. Users can use standard Caffe configuration files to specify their Caffe solver and deep network topology (e.g. solver.prototxt, net.prototxt 1110) with specification of training dataset location on HDFS (Hadoop Distributed File System) or storage cloud (such as Amazon S3).

Referring back to FIG. 5, the configuration information identifier 502 may forward the configuration information obtained from the request to the operation node selector 506 for selecting operation nodes, to the training data locator 504 for locating training data, and to the training instruction generator 510 for generating a training instruction.

The training data locator 504 in this example can determine a location of data for training the model, e.g. a training database, based on the configuration information from the request. In one embodiment, the training data locator 504 may directly obtain the training data from the training database. In another embodiment, the training data locator 504 may just obtain the location ID of the training data from the training database. The training data locator 504 may send the training data or their location IDs to the training data distributor 508 for allocating training data.

The operation node selector 506 in this example can determine the number of executors, i.e. number of operation nodes, based on the configuration information received from the configuration information identifier 502. In addition, the operation node selector 506 can select operation nodes in the cluster in accordance with the number. For example, to select five operation nodes based on the request, the operation node selector 506 may determine workloads of the operation nodes in the cluster and select the five operation nodes that have no or relatively low workloads. The operation node selector 506 may also determine the number of processing units for each selected operation node in accordance with the request. A processing unit within each node may be a CPU or a GPU. The operation node selector 506 can forward the information about the selected nodes to the training data distributor 508 for allocating training data.

The training data distributor 508 in this example receives training data information from the training data locator 504 and information of the selected operation nodes from the operation node selector 506. The training data distributor 508 can divide the training data into multiple training data subsets and allocate each subset to a selected operation node for estimating one or more parameters associated with a machine learning model. The one or more parameters may be related to feature extraction for training the machine learning model. The one or more parameters may be from the machine learning model itself. The one or more parameters may also be related to validation of a trained machine learning model. The training data distributor 508 may send the result of the allocation to the training instruction generator 510 for generating a training instruction.

The training instruction generator 510 in this example generates a training instruction and sends the instruction to the selected operation nodes for estimating the one or more parameters associated with a machine learning model. The instruction may include configuration information obtained from the configuration information identifier 502, training data allocation information from the training data distributor 508, and other metadata related to the distributed computing. In one example, the instruction may also include information for resuming a distributed machine learning, after detection of a node failure or learning failure.

The node failure detector 512 in this example can detect a failure of an operation node during a learning process. For example, the node failure detector 512 may detect a failure of an operation node based on a notification from the operation node to indicate that the estimating was not finished within predetermined time. In another example, the node failure detector 512 may detect a failure of an operation node based on a notification from another operation node to indicate that the synchronization with the failed operation node was unsuccessful. In one example, the node failure detector 512 can determine that the learning process fails or the whole cluster fails after detecting enough number of failures from the operation nodes within the learning process. The node failure detector 512 can send the detected failure information to the training instruction generator 510.

If some nodes in the cluster failed during the learning process, the training instruction generator 510 may instruct the remaining nodes to continue the learning process, starting from a last stored state of the learning process before the failures. If the whole cluster failed, the training instruction generator 510 can instruct one of the operation nodes to retrieve the stored snapshot of last state of the learning process, and resume the deep learning from the last state with other operation nodes, by sharing the last state with other operation nodes via a synchronization scheme, e.g. via MPI AllReduce based API, like RDMA, TCP, etc.

The training model determiner 514 in this example may receive a training complete notification from an operation node. Then the training model determiner 514 can obtain the estimated parameters associated with the machine learning model, either directly from the operation nodes or by retrieving the estimated parameters stored in the model storage 110 by the operation nodes. The training model determiner 514 may provide the trained model to the user as a response to the user request.

Figure 6:
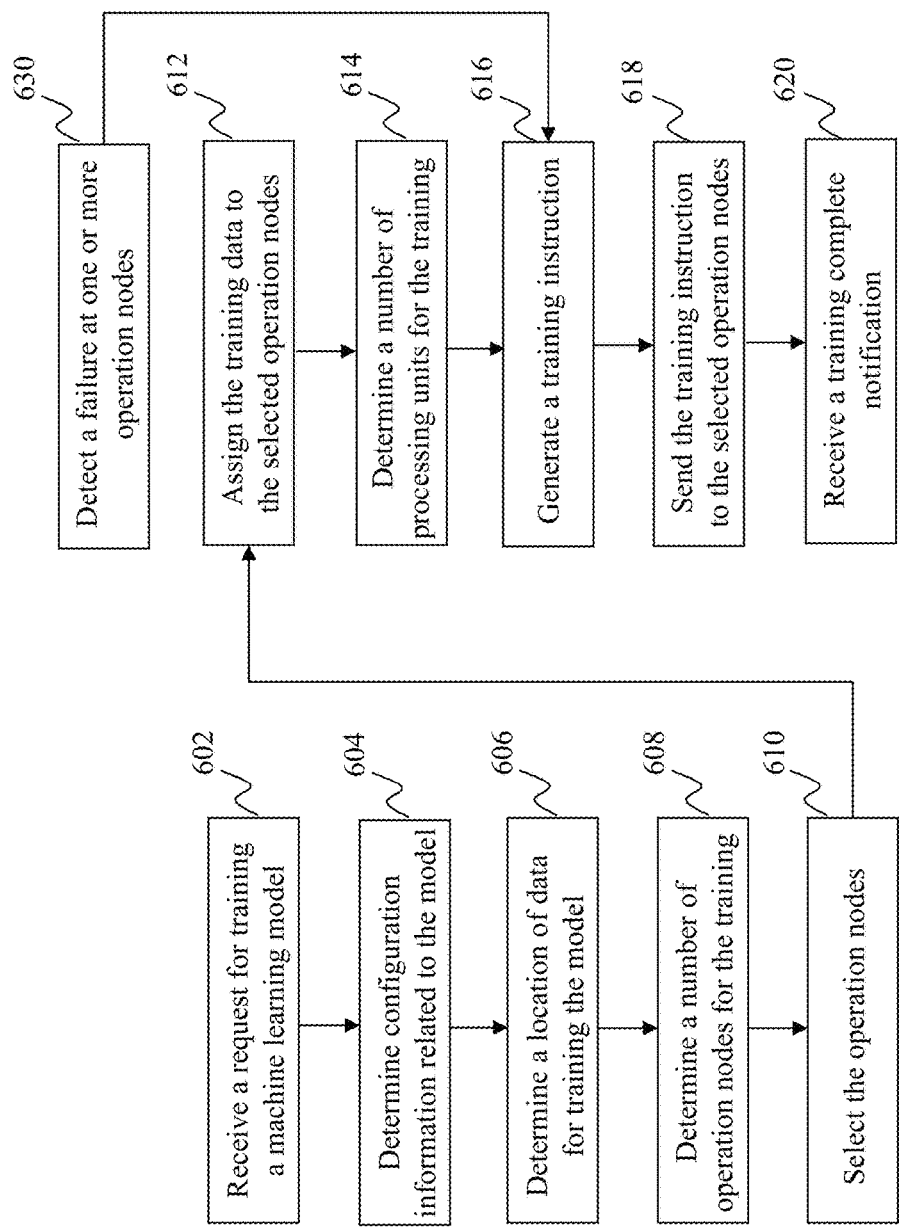
FIG. 6 is a flowchart of an exemplary process performed by a coordination node, according to an embodiment of the present teaching.

FIG. 6 is a flowchart of an exemplary process performed by a coordination node, e.g. the coordination node 108 in FIG. 5, according to an embodiment of the present teaching. A request for training a machine learning model is received at 602. In general, the request may be for estimating one or more parameters associated with a machine learning model. Configuration information related to the model is determined at 604. At 606, a location of the data for training the model is determined. At 608, the number of operation nodes is determined for the training. The operation nodes are selected based on the number, at 610.

At 612, the training data are assigned to the selected operation nodes, e.g. by dividing training data into multiple subsets and allocating each subset to a corresponding operation node. At 614, the number of processing units within each operation node is determined for the training. A training instruction is generated at 616, based on the configuration information, the selected nodes, etc. In one embodiment, a failure at one or more operation nodes is detected at 630. The training instruction may also be generated to include information about the detected failure. At 618, the training instruction is sent to the selected operation nodes. At 620, a training complete notification is received, e.g. from one of the operation nodes based on communication with other operation nodes.

Figure 7:
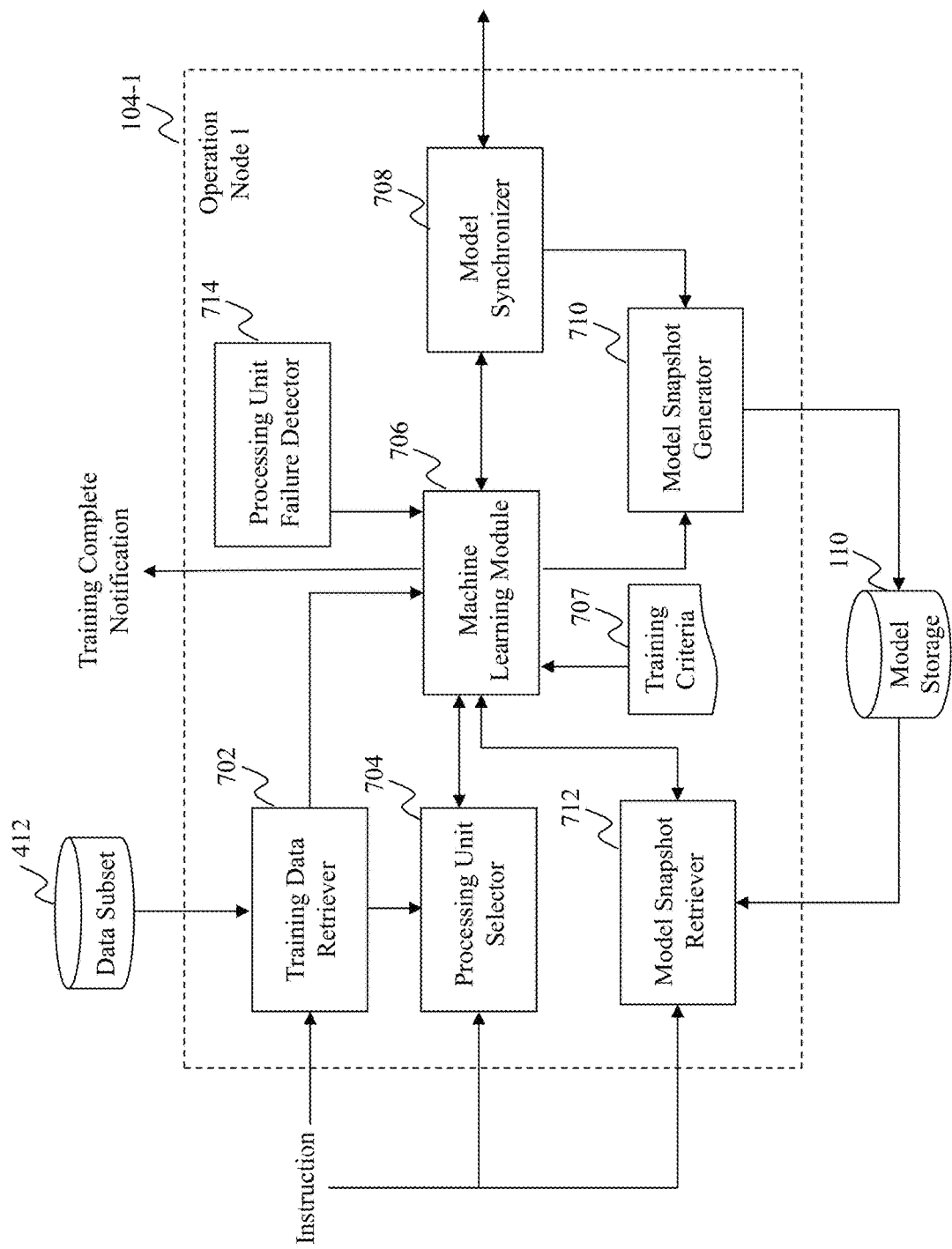
FIG. 7 illustrates an exemplary diagram of an operation node, according to an embodiment of the present teaching.

FIG. 7 illustrates an exemplary diagram of an operation node 104-1, according to an embodiment of the present teaching. As shown in FIG. 7, the operation node 104-1 in this example includes a training data retriever 702, a processing unit selector 704, a machine learning module 706, training criteria 707, a model synchronizer 708, a model snapshot generator 710, a model snapshot retriever 712, and a processing unit failure detector 714.

The training data retriever 702 in this example receives an instruction for training a model. In general, the instruction is for estimating one or more parameters associated with a machine learning model. In general, the one or more parameters may be used for feature extraction, training a machine learning model, or validating a model of a deep learning, etc. As discussed above, the instruction may include information about the training data allocation. Based on the instruction, the training data retriever 702 may retrieve a corresponding subset of training data allocated to the operation node 104-1. The training data retriever 702 may send the retrieved subset of training data to the processing unit selector 704 for selecting processing units and to the machine learning module 706 for executing the estimating.

The processing unit selector 704 in this example also receives the instruction which includes information about the number of processing units to be used in the operation node 104-1 for the estimating. For example, if the coordination node 108 reserves three GPUs of the operation node 104-1 for the estimating, the processing unit selector 704 can select the three GPUs in the machine learning module 706 accordingly, e.g. based on workloads of the GPUs in the machine learning module 706.

The machine learning module 706 in this example includes one or more processing units (e.g. CPUs and/or GPUs) and can execute the estimating using the selected processing units based on the retrieved subset of training data. Each selected processing unit can communicate with other selected processing units within the operation node 104-1, to share the estimated values of the parameters. In addition, the operation node 104-1 can also communicate with other operation nodes, via the model synchronizer 708. In one embodiment, the model synchronizer 708 may itself be one of the selected processing units for estimating the parameters.

Figure 9:
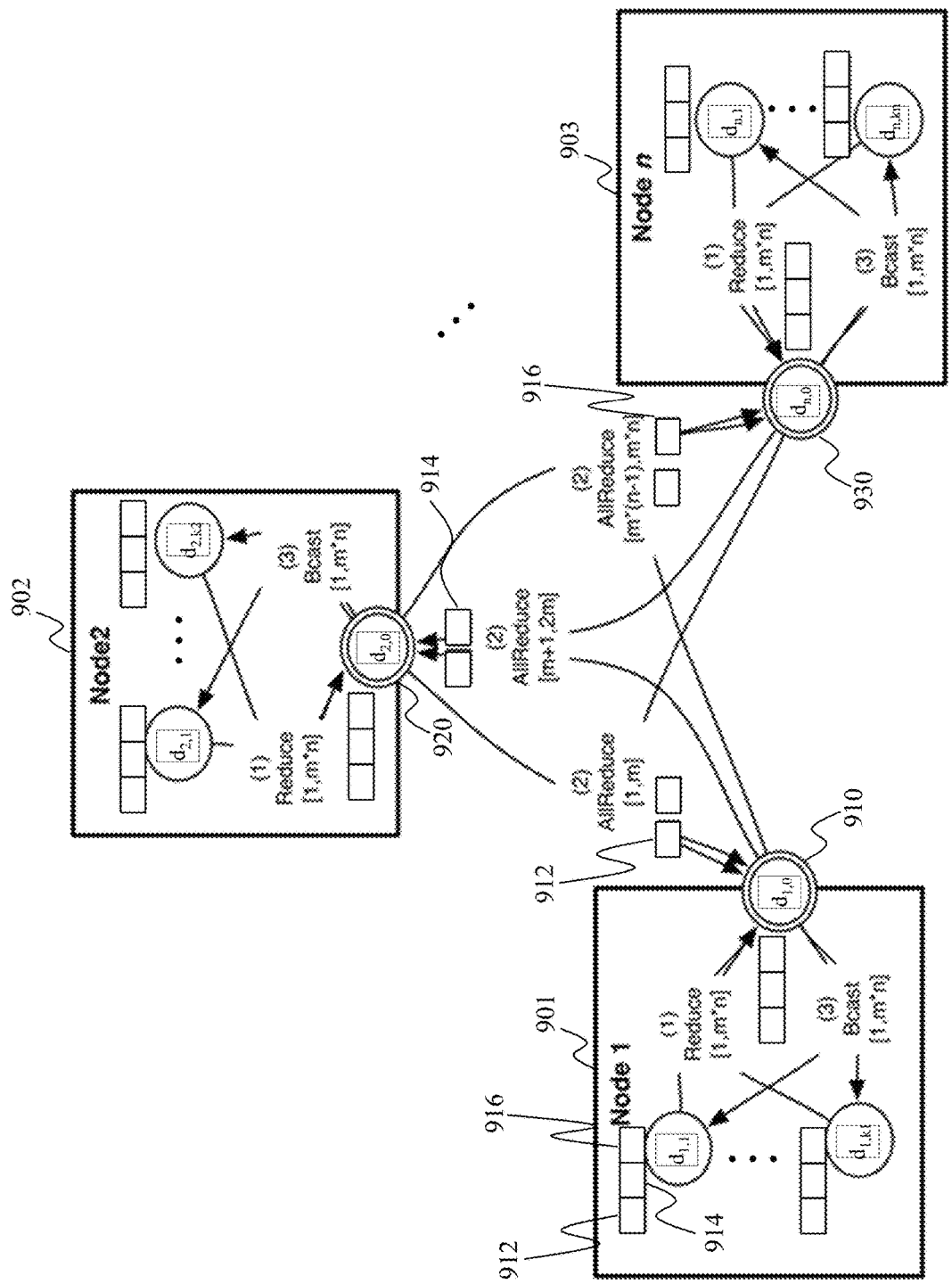
FIG. 9 illustrates an exemplary scheme of communications among multiple operation nodes, according to an embodiment of the present teaching.

FIG. 9 illustrates an exemplary scheme of communications among multiple operation nodes in a cluster, according to an embodiment of the present teaching. As shown in FIG. 9, the cluster includes n operation nodes Node 1 901, Node 2 902, ... Node n 903. Node 1 901 may include $k_1+1$ GPUs: $d_{1,0}, d_{1,1}, \ldots d_{1,k1}$; Node 2 902 may include $k_2+1$ GPUs: $d_{2,0}, d_{2,1}, \ldots d_{2,k2}$; ... Node n 903 may include $k_n+1$ GPUs: $d_{n,0}, d_{n,1}, \ldots d_{n,kn}$. Each GPU in each operation node may perform a training based on a small batch of the subset of training data corresponding to the node, to generate estimated values of the parameters associated with the machine learning model. In this example, the parameters are represented by a vector [1, m*n]. In practice, the parameters may be gradients of model parameters of the machine learning model. A machine learning process may be performed in iterations until a predetermined condition is met. For each iteration, after the training on all these GPUs in the operation nodes, the GPUs can perform synchronization through the following three stages.

In the first stage (1), called Reduce, one GPU in each operation node may collect the estimated values from other GPUs in the same node and logically add the estimated values together. For example, GPU $d_{1,0}$ 910 in Node 1 901 can obtain all estimated values of the vector [1, m*n] from other GPUs in Node 1 901 and aggregate them with the estimated values generated by the GPU $d_{1,0}$ 910 itself, e.g. by calculating a summation, an average, or a weighted average of these estimated values. As such, at the end of the first stage (1), GPU $d_{1,0}$ 910 in Node 1 901 has an aggregated estimate, called "reduced estimate", of the vector [1, m*n] within Node 1 910. In each of the other operation nodes, one GPU (e.g. GPU $d_{2,0}$ 920 in Node 2, ... GPU $d_{n,0}$ 930 in Node n) will perform similarly as the GPU $d_{1,0}$ 910 and obtain a reduced estimate of the vector [1, m*n] within that node. The GPU performing the above Reduce stage in each operation node, called "representing GPU" of the node, may be preselected by the node, or determined by the node during the training. As discussed above, the communication between the GPUs within an operation node may be performed via network interfaces like GPU direct, Infiniband and/or Ethernet.

Then at the second stage (2), called AllReduce, the representing GPU in each operation node may divide the vector [1, m*n] into n fractions: [1, m]; [m+1, 2m]; ... [m*(n−1), m*n]. Each of the n operation nodes in the cluster will own a corresponding one of the n fractions during the second stage. Then, each representing GPU in an operation node will collect the reduced estimates of its owned fraction from other representing GPUs of other operation nodes. For example, GPU $d_{1,0}$ 910 may own the fraction [1, m] 912; GPU $d_{2,0}$ 920 may own the fraction [m+1, 2m] 914; ... GPU $d_{n,0}$ 930 may own the fraction [m*(n−1), m*n] 916. Then, GPU $d_{1,0}$ 910 will collect the reduced estimates of the fraction [1, m] 912 from other representing GPUs at other operation nodes; GPU $d_{2,0}$ 920 will collect the reduced estimates of the fraction [m+1, 2m] 914 from other representing GPUs at other operation nodes; and GPU $d_{n,0}$ 930 will collect the reduced estimates of the fraction [m*(n−1), m*n] 916 from other representing GPUs at other operation nodes. After collecting the reduced estimates of the corresponding fraction, each representing GPU may aggregate them with its own reduced estimate to generate an "all reduced estimate" of the corresponding fraction, e.g. by calculating a summation, an average, or a weighted average of these reduced estimates. Then, each representing GPU can broadcast the "all reduced estimate" of its owned fraction to the other representing GPUs at the other operation nodes. For example, GPU $d_{1,0}$ 910 may generate an "all reduced estimate" of the fraction [1, m] 912 based on the "reduced estimates" of the fraction [1, m] 912 generated by the representing GPUs during the first stage, and broadcast the "all reduced estimate" of the fraction [1, m] 912 to the other representing GPUs; GPU $d_{2,0}$ 920 may generate an "all reduced estimate" of the fraction [m+1, 2m] 914 based on the "reduced estimates" of the fraction [m+1, 2m] 914 generated by the representing GPUs during the first stage, and broadcast the "all reduced estimate" of the fraction [m+1, 2m] 914 to the other representing GPUs; and GPU $d_{n,0}$ 930 may generate an "all reduced estimate" of the fraction [m*(n−1), m*n] 916 based on the "reduced estimates" of the fraction [m*(n−1), m*n] 916 generated by the representing GPUs during the first stage, and broadcast the "all reduced estimate" of the fraction [m*(n−1), m*n] 916 to the other representing GPUs. As such, at the end of the second stage (2), each representing node at each operation node has an "all reduced estimate" of the entire vector [1, m*n], i.e. a final estimate of the parameters associated with the machine learning model in the current iteration, called "iteration final estimate" of the parameters. The communication between the representing GPUs across operation nodes may be performed via network interfaces like GPU direct, Infiniband and/or Ethernet.

Then at the third stage (3), called Bcast, the representing GPU in each operation node may broadcast the "iteration final estimate" of the parameters, i.e. the "iteration final estimate" of the vector [1, m*n], to the other GPUs within the operation node. For example, GPU $d_{1,0}$ 910 broadcasts the "iteration final estimate" of the parameters to GPUs $d_{1,1} \ldots d_{1,k1}$ in Node 1 901; GPU $d_{2,0}$ 920 broadcasts the "iteration final estimate" of the parameters to GPUs $d_{2,1} \ldots d_{2,k2}$ in Node 2 902; and GPU $d_{n,0}$ 930 broadcasts the "iteration final estimate" of the parameters to GPUs $d_{n,1} \ldots d_{n,kn}$ in Node n 903. As such, at the end of the third stage (3), each GPU in each operation node obtains the "iteration final estimate" of the parameters associated with the machine learning model. The communication between the GPUs within an operation node may be performed via network interfaces like GPU direct, Infiniband and/or Ethernet.

After the three stages, all the executing GPUs in the operation nodes are synchronized regarding the state of the machine learning, because all the executing GPUs have the same "iteration final estimate" of the parameters associated with the machine learning model, during this iteration. Before performing the next iteration, a snapshot of the state of the machine learning may be taken from one GPU at one operation node. For example, a snapshot of the "iteration final estimate" of the parameters may be taken from GPU $d_{1,0}$ 910, and stored in a storage outside all of the operation nodes.

After the last iteration when a predetermined condition is met, all the executing GPUs have the same final estimate of the parameters associated with the machine learning model. Then, one GPU at one operation node can inform the coordination node that the distributed training is complete. The GPU may send the final estimate to the coordination node directly or store the final estimate into the model storage 110 for the coordination node to retrieve. As such, for all iterations during the entire process of distributed training, the operation nodes can execute and exchange the estimated values to obtain the final estimate and finish the distributed training, without help from the coordination node.

It can be understood that the system can predetermine the one GPU in the one operation node for taking a snapshot after each round of iteration or for informing the coordination node that the training is complete. It can also be understood that CPU, instead of or in addition to GPU, may be used for the operations shown in FIG. 9.

Referring back to FIG. 7, the machine learning module 706 may include one or more selected GPUs for performing the operations as shown in FIG. 9. In one embodiment, the representing GPU in the operation node 1 104-1 is included in the machine learning module 706, such that the representing GPU may synchronize with other operation nodes via the model synchronizer 708, and/or generate and store a model state snapshot to the model storage 110 via the model snapshot generator 710 at the end of each round of iteration. In this case, the machine learning module 706 may determine whether some training criteria 707 have been met after each round of iteration. The training criteria 707 may be related to a condition for stopping the training or finishing the training. For example, a condition may be met for stopping the training when the difference between two iteration final estimates of two consecutive iterations is less than a predetermined threshold. In another example, a condition may be met for finishing the training when all the training data have been utilized for a predetermined number of times during the training. When the machine learning module 706 determines that the training criteria 707 are met, the machine learning module 706 will inform the coordination node that the training is complete.

In other embodiments, the representing GPU in the operation node 1 104-1 may be included in the model synchronizer 708 or the model snapshot generator 710. The model synchronizer 708 may utilize a synchronization scheme, e.g. RDMA, to realize the second synchronization stage (2) as shown in FIG. 9.

The model snapshot generator 710 in this example may generate a snapshot to record the calculated results of the machine learning module 706 and/or the model synchronizer 708, e.g. via memory access, and then store the snapshot associated with an iteration number and a training ID into the model storage 110. The model storage 110 in this example may store trained models or state snapshots of a model during a distributed training. Each snapshot stored in the model storage 110 may be associated with a training ID that identifies a training task, associated with one or more operation nodes that executed the training task, and associated with an iteration number that indicates how many rounds of iteration have been performed during the training task before the snapshot.

During the training execution at the operation node 104-1, the processing unit failure detector 714 may detect a failure of one or more processing units (e.g. CPUs or GPUs). For example, there are three selected GPUs in the operation node 104-1 for the machine learning, and the processing unit failure detector 714 may detect a failure of one of the three selected GPUs at an iteration round. The processing unit failure detector 714 may then inform the other two selected GPUs in the machine learning module 706 about the failure.

In one example, the machine learning module 706 may reallocate the training data subset to the remaining two GPUs for resuming the machine learning process. In another example, the machine learning module 706 may reinitiate or restart the failed GPU for resuming the machine learning process. In either case, the machine learning module 706 can inform the model snapshot retriever 712 to retrieve a model snapshot from the model storage 110 for resuming the machine learning process. The snapshot is a record of estimates of the machine learning parameters from last iteration round before the failure. As such, the GPUs can read the state of the snapshot and resume the machine learning process from that state.

The model snapshot retriever 712 in this example may retrieve a snapshot from the model storage 110, either based on the instruction from the coordination node 108 or based on a request from the machine learning module 706. The instruction from the coordination node 108 may indicate a failure of another operation node or a failure of the entire machine learning process, such that the model snapshot retriever 712 may be instructed to retrieve the snapshot of last iteration round from the model storage 110 for resuming the machine learning process. A request from the machine learning module 706 may indicate a failure of a processing unit in the operation node 104-1, such that the model snapshot retriever 712 may be instructed to retrieve the snapshot of last iteration round from the model storage 110 for resuming the machine learning process, at the remaining processing units. Because the model storage 110 is located outside any operation node, a failure from any operation node will not impact the snapshots stored in the model storage 110. If a representing GPU fails, one of the remaining GPUs may be designated as the representing GPU in the operation node 104-1.

Figure 8:
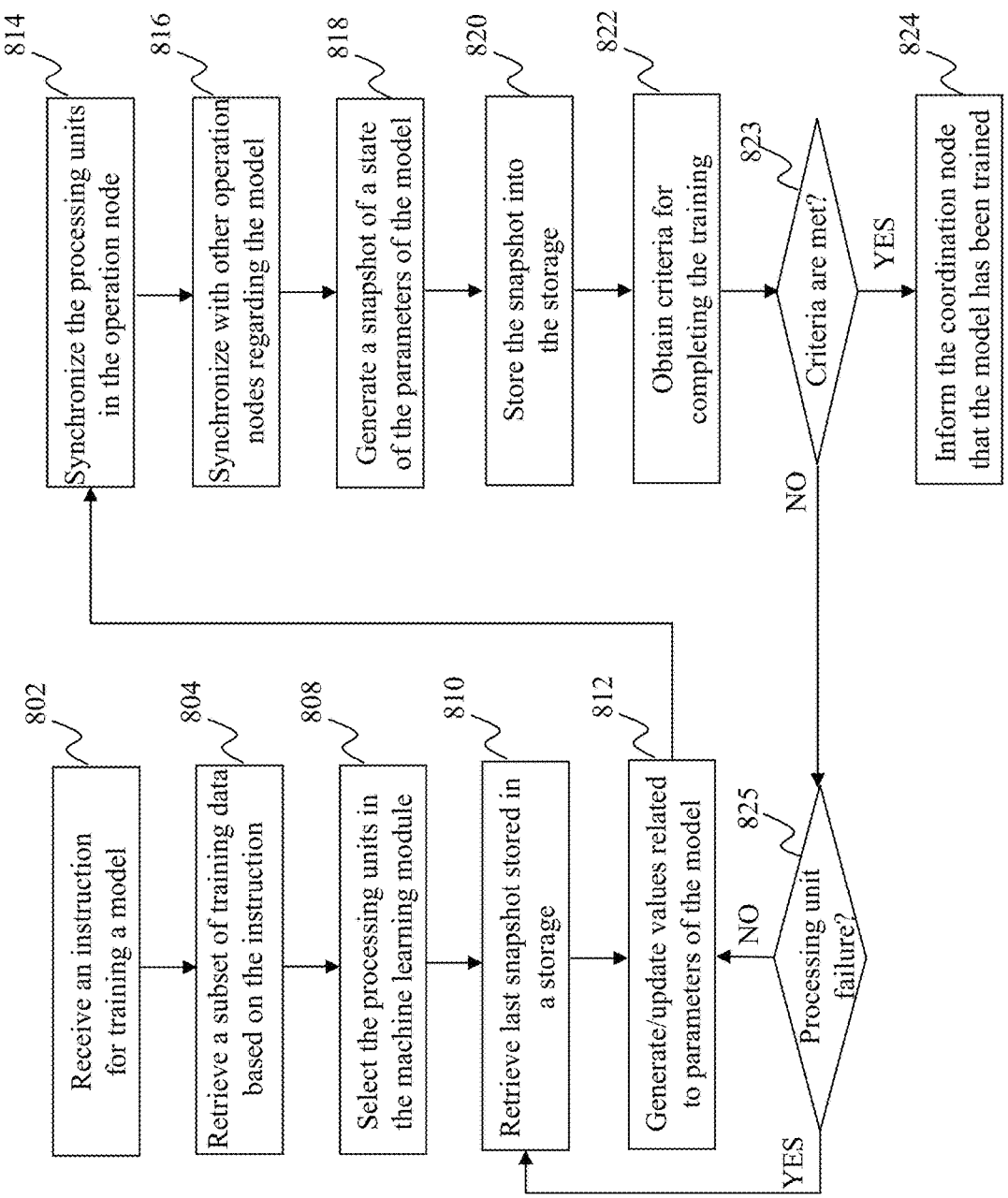
FIG. 8 is a flowchart of an exemplary process performed by an operation node, according to an embodiment of the present teaching.

FIG. 8 is a flowchart of an exemplary process performed by an operation node, e.g. the operation node 104-1 in FIG. 7, according to an embodiment of the present teaching. At 802, an instruction is received for training a machine learning model or estimating parameters associated with the machine learning model. A subset of training data is retrieved at 804 based on the instruction. At 808, one or more processing units are selected based on the instruction. A last snapshot from last iteration round may be retrieved at 810 from a model storage. The estimated values related to the parameters of the model are generated or updated at 812.

The selected processing units (e.g. CPUs and/or GPUs) in the operation node are synchronized at 814. The operation node is synchronized at 816 with other operation nodes regarding the parameters of the model. A snapshot of a state of the parameters of the model is generated at 818, to record the result of a current iteration round. At 820, the snapshot is stored into the storage that may be located outside the operation node or even outside the cluster. One or more criteria are obtained at 822 for completing the training.

It is determined at 823 whether the criteria are met. If so, the process goes to 824 for informing the coordination node that the model training or estimating is complete. If not, the process goes to 825, for determining whether there is any failed processing unit. If there is no failure of any processing unit, the process moves back to 812 for the next iteration round. If there is a failure of any processing unit, the process moves back to 810 for retrieving a snapshot of last iteration round and starting the next iteration round.

Figure 10:
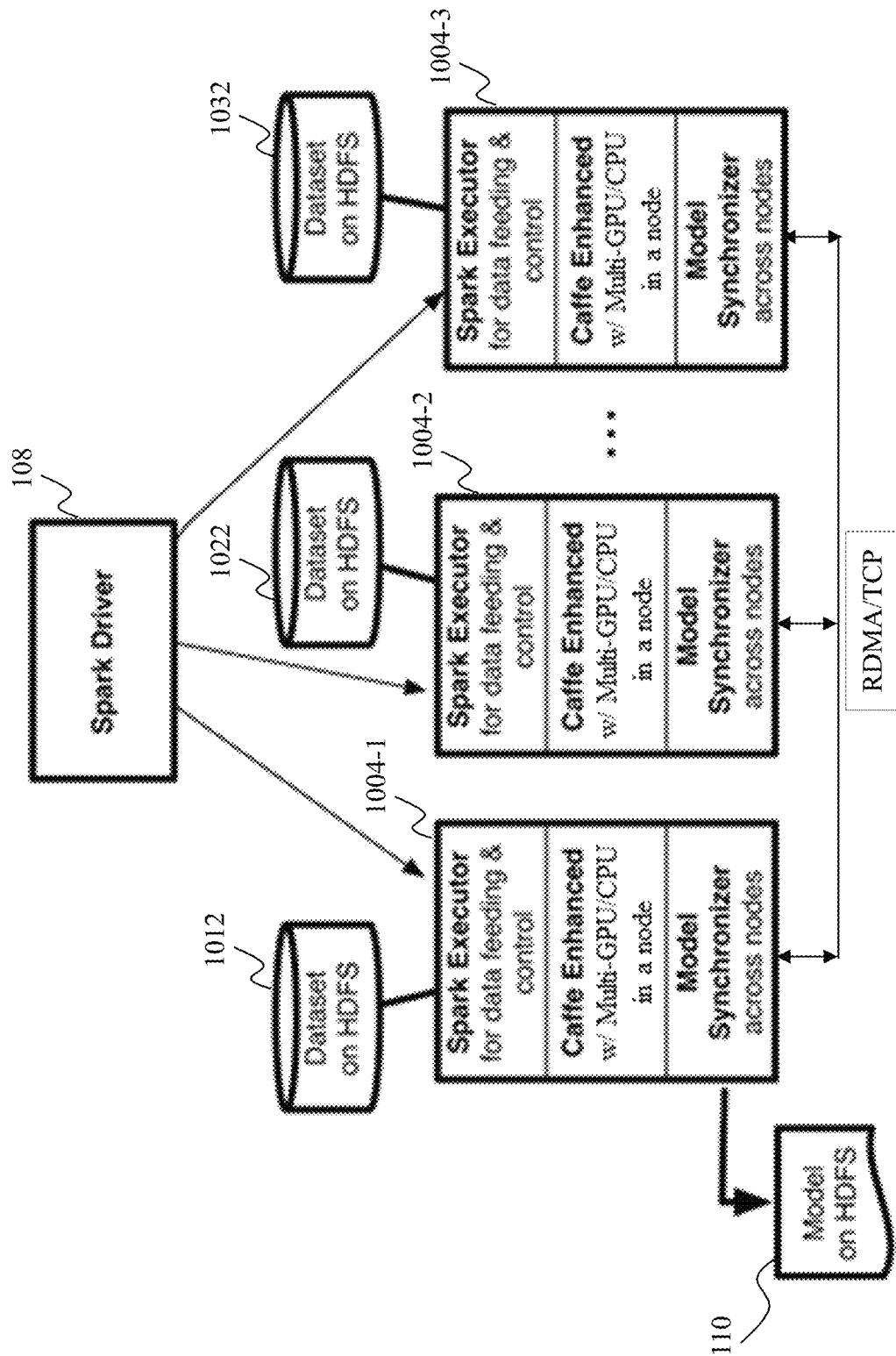
FIG. 10 illustrates another exemplary scheme of distributed machine learning on a cluster based on Spark framework, according to an embodiment of the present teaching.

FIG. 10 illustrates another exemplary scheme of distributed machine learning on a cluster based on Spark framework, according to an embodiment of the present teaching. As shown in FIG. 10, the coordination node 108 in this cluster is called Spark Driver for driving the operation nodes 1004-1, . . . 1004-3 to perform a machine learning, e.g. to estimate a model parameter in a distributed deep learning, in a Spark framework. The machine learning may be based on training dataset on HDFS which is a Java-based file system that provides scalable and reliable data storage and was designed to span large clusters of commodity servers. The Spark Driver 108 may divide the training dataset into multiple data subsets 1012, 1022, 1032 and allocate each of the data subsets to one of the operation nodes, i.e. Spark Executors 1004-1, 1004-2, 1004-3, for estimating the parameter. In this example, each Spark Executor may feed and control training data subset, and execute the training based on an enhanced Caffe library with multiple GPUs/CPUs. The GPUs/CPUs within each Spark Executor can exchange calculation results after each iteration round. For example, each Spark Executor can have two separate network interfaces, Ethernet and Infiniband. While Ethernet can act as the primary interface for external communication, Infiniband can provide 10 times faster connectivity among the Spark Executors in the cluster. It can be understood that in other embodiments, the Infiniband can act as the primary interface for external communication, while Ethernet can provide connectivity among the Spark Executors in the cluster. It can also be understood that other network interfaces can also be utilized for connections between Spark Executors or among GPUs/CPUs in each Spark Executor.

Each Spark Executor may include a model synchronizer configured for communicating with other Spark Executors directly, e.g. via RDMA or TCP, without the help from the Spark Driver 108. As such, after each iteration round, the Spark Executors can be synchronized to share a same state of the training model. In addition, each GPU or CPU in each Spark Executor can obtain the shared state. In one embodiment, one GPU or CPU in one Spark Executor can take a snapshot of the state and store it into the model storage 110 which is on HDFS. Because the model storage 110 is outside the Spark Executors, if one or more Spark Executors fail during a machine learning, the rest nodes can resume based on last stored state of the model in the model storage 110.

In one embodiment, a user may use standard Caffe configuration files to specify his/her Caffe solver and deep network topology, and simply submit a user request, e.g. in form of a command shown in FIG. 11, to the system for distributed machine learning.

In another embodiment, a user may write a program based on an application program interface (API) associated with the system, and utilize the program to define configuration parameters for distributed machine learning. FIG. 12 illustrates an exemplary API 1210 for distributed machine learning, according to an embodiment of the present teaching. The API 1210 is an example of an interface that includes a set of routines, protocols, and tools for building software applications related to machine learning based on the Caffe library in Spark framework. FIG. 13 illustrates an exemplary program 1310 written by a user for distributed machine learning, according to an embodiment of the present teaching.

Figure 16:
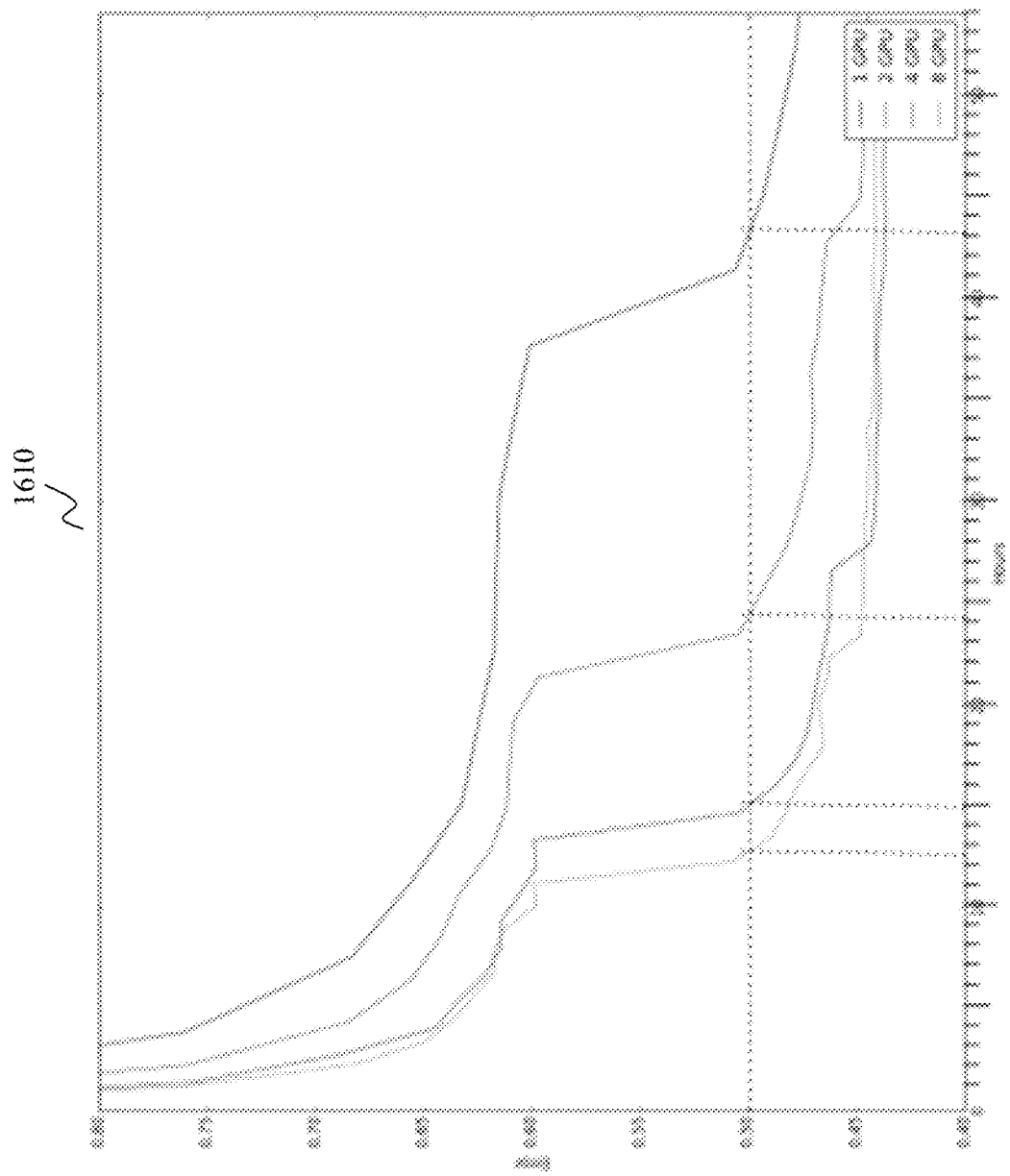
FIG. 16 illustrates a performance benchmark of an exemplary scheme of distributed machine learning, according to an embodiment of the present teaching.

FIG. 16 illustrates a performance benchmark of an exemplary scheme of distributed machine learning, according to an embodiment of the present teaching. FIG. 16 shows results of a deep learning for AlexNet (a Caffe based model) with 1 GPU, 2 GPUs, 4 GPUs and 8 GPUs with a single Spark executor. As illustrated in the diagram 1610, training time decreases as the number of GPUs increases. With 4 GPUs, the system achieves 50% accuracy in about 15/43=35% the time required by a single GPU. All these executions use identical total batch size 256. The setup with 8 GPUs did not show significant improvement over 4 GPUs, as the overall batch size was too small on each GPU to use the hardware efficiently.

Figure 17:
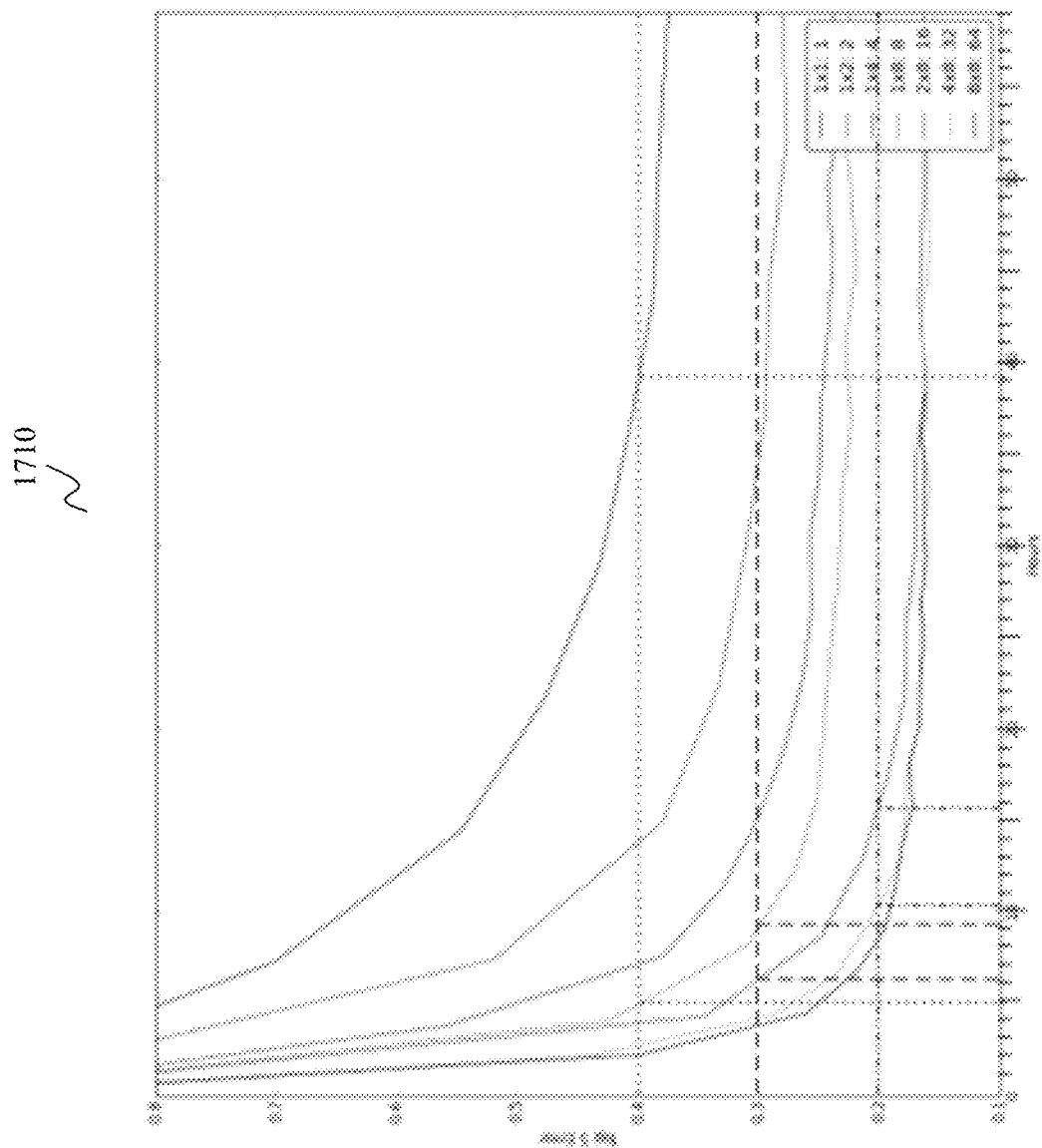
FIG. 17 illustrates another performance benchmark of an exemplary scheme of distributed machine learning, according to an embodiment of the present teaching.

FIG. 17 illustrates another performance benchmark of an exemplary scheme of distributed machine learning, according to an embodiment of the present teaching. FIG. 17 shows performances of a distributed benchmark with GoogLeNet (another Caffe based model). GoogLeNet is much deeper and uses more convolutions than AlexNet, and thus requires more computation power. In each run, the system arranges each GPU to handle batches of size 32, for an effective batch size of 32n when n GPUs are used. The distributed algorithm is designed to produce models and end-result precision equivalent to running on a single GPU. As illustrated in the diagram 1710, the training reached 80% top-5 accuracy (20% error) in 10 hours of training with 4 servers (4×8 GPUs). A training with 1 GPU reached only 60% top-5 accuracy (40% error) after 40 hours.

Figure 14:
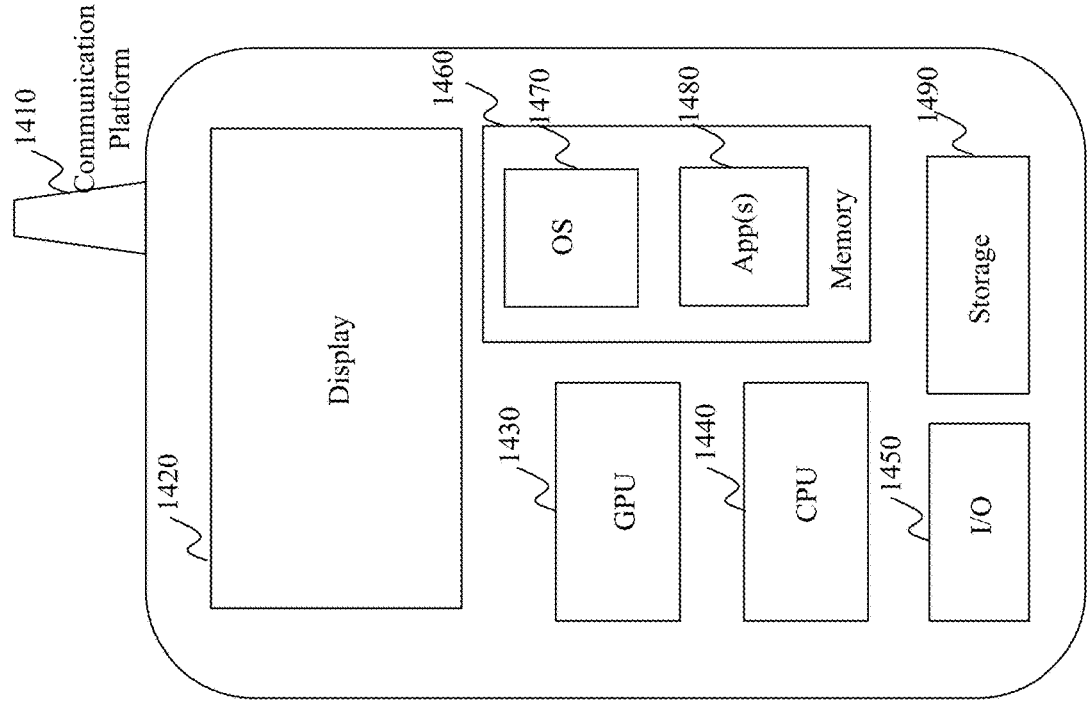
FIG. 14 depicts the architecture of a mobile device which can be used to implement a specialized system incorporating the present teaching.

FIG. 14 depicts the architecture of a mobile device which can be used to realize a specialized system implementing the present teaching. In this example, the operation node or the coordination node is a mobile device 1400, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1400 in this example includes one or more central processing units (CPUs) 1440, one or more graphic processing units (GPUs) 1430, a display 1420, a memory 1460, a communication platform 1410, such as a wireless communication module, storage 1490, and one or more input/output (I/O) devices 1450. Any other suitable component, including but not limited to a system bus or a controller (not shown), may also be included in the mobile device 1400. As shown in FIG. 14, a mobile operating system 1470, e.g., iOS, Android, Windows Phone, etc., and one or more applications 1480 may be loaded into the memory 1460 from the storage 1490 in order to be executed by the CPU 1440. The applications 1480 may include a browser or any other suitable mobile apps for distributed machine learning on the mobile device 1400. User interactions with the device 1400 may be achieved via the I/O devices 1450.

To implement various modules, units, and their functionalities described in the present disclosure, computer hardware platforms may be used as the hardware platform(s) for one or more of the elements described herein (e.g., the operation node 104-1, the coordination node 108, and/or other components of the systems 100 and 200 described with respect to FIGS. 1-13). The hardware elements, operating systems and programming languages of such computers are conventional in nature, and it is presumed that those skilled in the art are adequately familiar therewith to adapt those technologies to distributed machine learning as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 15:
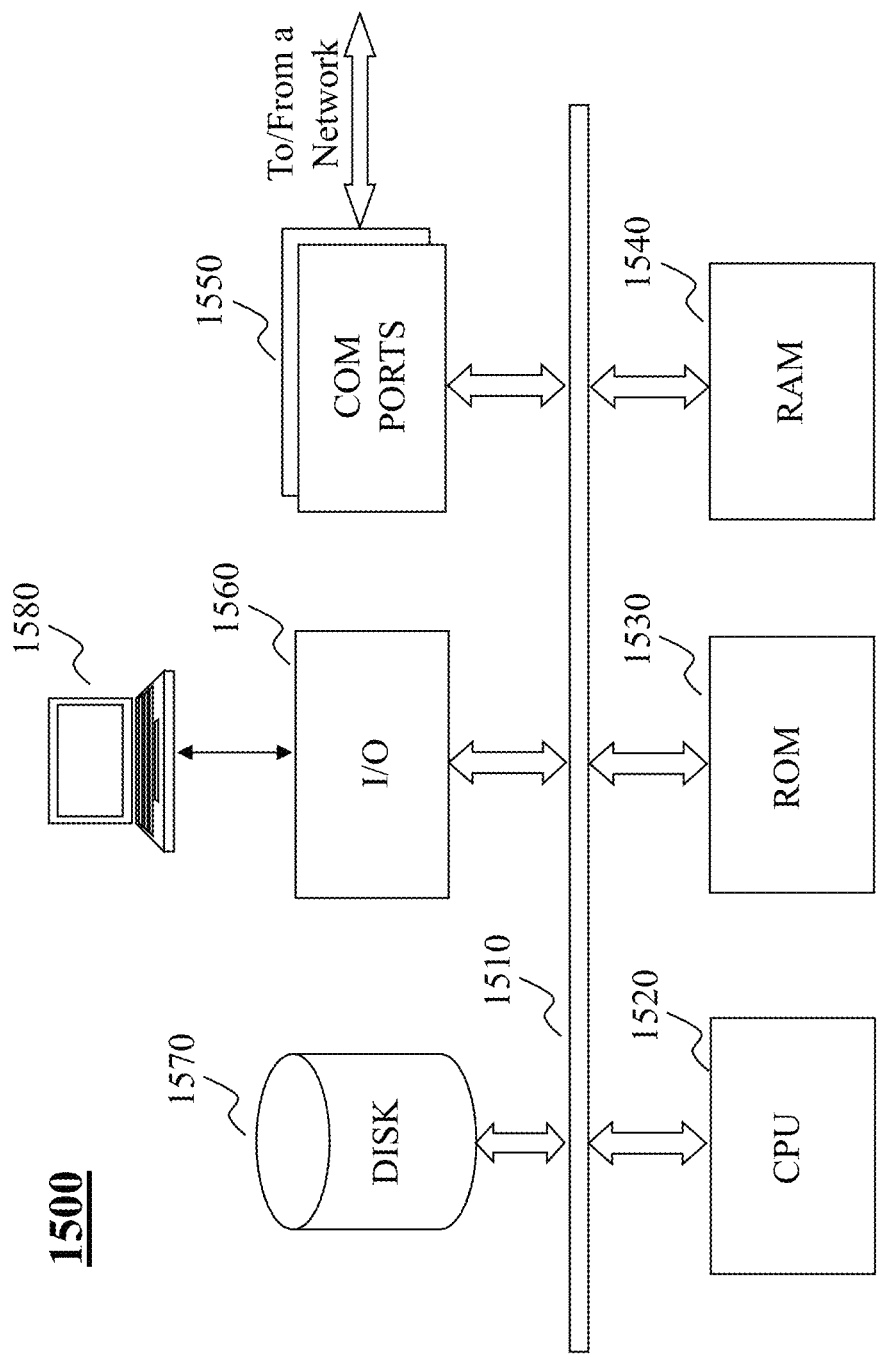
FIG. 15 depicts the architecture of a computer which can be used to implement a specialized system incorporating the present teaching.

FIG. 15 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1500 may be used to implement any component of the distributed machine learning techniques, as described herein. For example, the operation node 104-1, the coordination node 108, etc., may be implemented on a computer such as computer 1500, via its hardware, software program, firmware, or a combination thereof. Although only one such computer is shown, for convenience, the computer functions relating to distributed machine learning as described herein may be implemented in a distributed fashion on a number of similar platforms, to distribute the processing load.

The computer 1500, for example, includes COM ports 1550 connected to and from a network connected thereto to facilitate data communications. The computer 1500 also includes a central processing unit (CPU) 1520, in the form of one or more processors, for executing program instructions. The exemplary computer platform includes an internal communication bus 1510, program storage and data storage of different forms, e.g., disk 1570, read only memory (ROM) 1530, or random access memory (RAM) 1540, for various data files to be processed and/or communicated by the computer, as well as possibly program instructions to be executed by the CPU. The computer 1500 also includes an I/O component 1560, supporting input/output flows between the computer and other components therein such as user interface elements 1580. The computer 1500 may also receive programming and data via network communications.

Hence, aspects of the methods of distributed machine learning, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with distributed machine learning techniques. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the distributed machine learning as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one computing device each of which has at least one processor, storage, and a communication platform connected to a network for estimating one or more parameters of a machine learning model, the method comprising:
    estimating, by each of a plurality of processing units in a first node of a plurality of nodes, values of the one or more parameters associated with the machine learning model, wherein each of the plurality of processing units estimates the values based on a batch of a subset of training data allocated to the first node;
    generating, by a preselected representative processing unit of the first node preselected from the plurality of the processing units, a vector by aggregating the values of the one or more parameters estimated by the plurality of processing units in the first node;
    dividing, by the representative processing unit of the first node, the vector into a plurality of fractions, each of which is designated to one of the plurality of nodes;
    identifying a first fraction and remaining fractions of the plurality of fractions, wherein the first fraction is designated to the first node and the remaining fractions are designated to corresponding other nodes of the plurality of nodes;
    aggregating the first fraction designated to the first node and the first fractions received from other nodes of the plurality of nodes to generate an aggregated first fraction;
    sending, by the representative processing unit of the first node, the aggregated first fraction to representative processing units of the other nodes of the plurality of nodes;
    receiving, by the representative processing unit of the first node, from the representative processing units of the other nodes of the plurality of nodes, aggregated remaining fractions of the remaining fractions designated to the other nodes;
    creating an iteration final estimate of the one or more parameters based on the aggregated first fraction and the aggregated remaining fractions;
    broadcasting, by the representative processing unit of the first node, the iteration final estimate to all other processing units of the plurality of processing units in the first node to synchronize a learning state of the machine-learning model across the plurality of nodes; and
    iterating the above recited steps until a predetermined condition is met.

2. The method of claim 1, further comprising:
    generating a snapshot of a state of the one or more parameters of the model; and
    storing the snapshot in a storage outside the plurality of nodes.

3. The method of claim 2, further comprising:
    in response to a failure with respect to estimating the one or more parameters, retrieving the snapshot of the state of the one or more parameters of the model from the storage; and
    continuing to estimate the one or more parameters based on the last state of the one or more parameters.

4. The method claim 1, wherein the plurality of nodes are synchronized via a Message Passing Interface (MPI) AllReduce based Application Program Interface (API) using a network interface implemented on each of the plurality of nodes, wherein the network interface includes an Ethernet interface, an Infiniband interface, or the Ethernet interface and the Infiniband interface.

5. The method of claim 1, wherein the preselected representative processing unit is a graphical processing unit.

6. A system, having at least one processor, storage, and a communication platform connected to a network for estimating one or more parameters of a machine learning model, the system comprising:
    a first node, of a plurality of nodes, implemented by the at least one processor and configured for:
    estimating, by each of a plurality of processing units in the first node, values of the one or more parameters associated with the machine learning model, wherein each of the plurality of processing units estimates the values based on a batch of a subset of training data allocated to the first node;
    generating, by a preselected representative processing unit of the first node preselected from the plurality of the processing units, a vector by aggregating the values of the one or more parameters estimated by the plurality of processing units in the first node;

dividing, by the representative processing unit of the first node, the vector into a plurality of fractions, each of which is designated to one of the plurality of nodes;

identifying a first fraction and remaining fractions of the plurality of fractions, wherein the first fraction is designated to the first node and the remaining fractions are designated to corresponding other nodes of the plurality of nodes;

aggregating the first fraction designated to the first node and the first fractions received from other nodes of the plurality of nodes to generate an aggregated first fraction;

sending, by the representative processing unit of the first node, the aggregated first fraction to representative processing units of the other nodes of the plurality of nodes;

receiving, by the representative processing unit of the first node, from the representative processing units of the other nodes of the plurality of nodes, aggregated remaining fractions of the remaining fractions designated to the other nodes;

creating an iteration final estimate of the one or more parameters based on the aggregated first fraction and the aggregated remaining fractions;

broadcasting, by the representative processing unit of the first node, the iteration final estimate to all other processing units of the plurality of processing units in the first node to synchronize a learning state of the machine-learning model across the plurality of nodes; and iterating the above recited steps until a predetermined condition is met; and the other nodes, of the plurality of nodes, implemented by the at least one processor and configured for:

receiving the aggregated first fraction of the vector from the first node; and sending the aggregated remaining fractions of the vector designated to the other nodes to the first node.

7. The system of claim 6, wherein the first node comprises:

a model snapshot generator implemented by the at least one processor and configured for generating a snapshot of a state of the one or more parameters of the model; and storing the snapshot in a storage outside the plurality of nodes.

8. The system of claim 7, wherein the first node is implemented by the at least one processor and configured further for:

in response to a failure with respect to estimating the one or more parameters, retrieving the snapshot of the state of the one or more parameters of the model from the storage; and continuing to estimate the one or more parameters based on the last state of the one or more parameters.

9. The system claim 6, wherein the plurality of nodes are synchronized via a Message Passing Interface (MPI) AllReduce based Application Program Interface (API) using a network interface implemented on each of the plurality of nodes, wherein the network interface includes an Ethernet interface, an Infiniband interface, or the Ethernet interface and the Infiniband interface.

10. The system of claim 6, wherein the preselected representative processing unit is a graphical processing unit.

11. A machine-readable tangible and non-transitory medium having information for estimating one or more parameters of a machine learning model, wherein the information, when read by a first node of a plurality of nodes, causes the first node to perform the following:

estimating, by each of a plurality of processing units in the first node of the plurality of nodes, values of the one or more parameters associated with the machine learning model, wherein each of the plurality of processing units estimates the values based on a batch of a subset of training data allocated to the first node;

generating, by a preselected representative processing unit of the first node preselected from the plurality of the processing units, a vector by aggregating the values of the one or more parameters estimated by the plurality of processing units in the first node;

dividing, by the representative processing unit of the first node, the vector into a plurality of fractions, each of which is designated to one of the plurality of nodes;

identifying a first fraction and remaining fractions of the plurality of fractions, wherein the first fraction is designated to the first node and the remaining fractions are designated to corresponding other nodes of the plurality of nodes;

aggregating the first fraction designated to the first node and the first fractions received from other nodes of the plurality of nodes to generate an aggregated first fraction;

sending, by the representative processing unit of the first node, the aggregated first fraction to representative processing units of the other nodes of the plurality of nodes;

receiving, by the representative processing unit of the first node, from the representative processing units of the other nodes of the plurality of nodes, aggregated remaining fractions of the remaining fractions designated to the other nodes;

creating an iteration final estimate of the one or more parameters based on the aggregated first fraction and the aggregated remaining fractions;

broadcasting, by the representative processing unit of the first node, the iteration final estimate to all other processing units of the plurality of processing units in the first node to synchronize a learning state of the machine-learning model across the plurality of nodes; and iterating the above recited steps until a predetermined condition is met.

12. The machine-readable tangible and non-transitory medium of claim 11, wherein the information, when read by the first node, causes the first node to further perform:

generating a snapshot of a state of the one or more parameters of the model; and storing the snapshot in a storage outside the plurality of nodes.

13. The machine-readable tangible and non-transitory medium of claim 12, wherein the information, when read by the first node, causes the first node to further perform:

in response to a failure with respect to estimating the one or more parameters, retrieving the snapshot of the state of the one or more parameters of the model from the storage; and continuing to estimate the one or more parameters based on the last state of the one or more parameters.

14. The machine-readable tangible and non-transitory medium of claim 11, wherein the plurality of nodes are synchronized via a Message Passing Interface (MPI) AllReduce based Application Program Interface (API) using a network interface implemented on each of the plurality of nodes, wherein the network interface includes an Ethernet interface, an Infiniband interface, or the Ethernet interface and the Infiniband interface.

\* \* \* \* \*